Nov. 7, 1950      W. F. HUNSDORF      2,529,218
COLLET CHUCK
Filed May 10, 1947
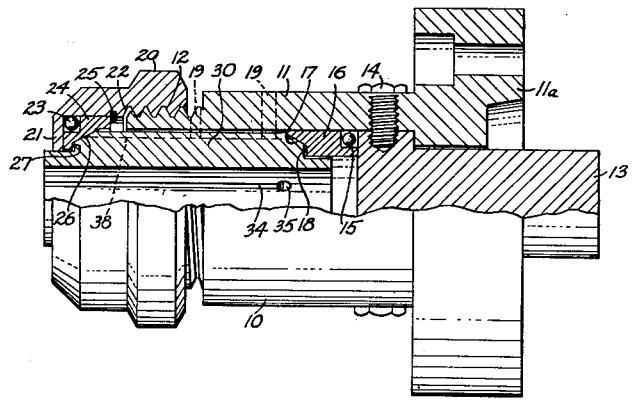
Fig. 1
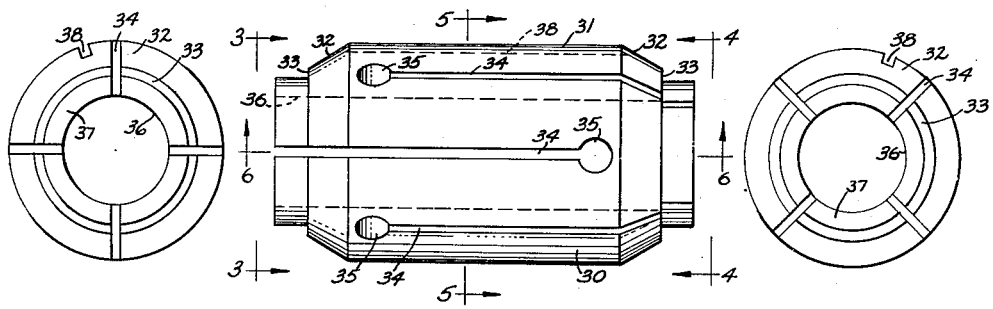
Fig. 3      Fig. 2      Fig. 4
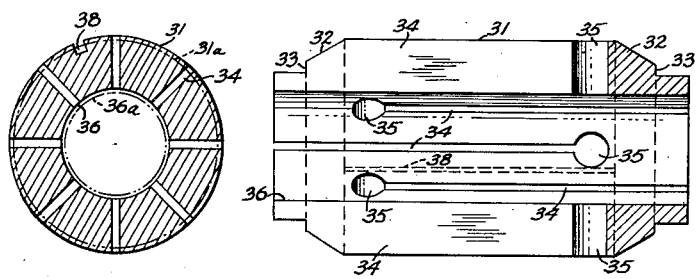 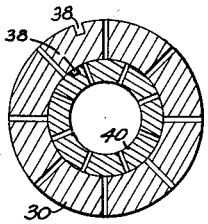
Fig. 5      Fig. 6      Fig. 8
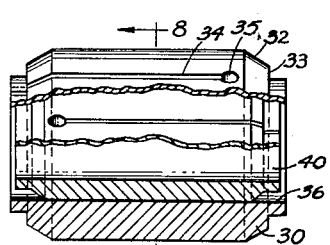
Fig. 7
INVENTOR.
WILLIAM F. HUNSDORF
BY *Sanford Schnurmacher*
ATTORNEYS.

Patented Nov. 7, 1950

2,529,218

UNITED STATES PATENT OFFICE 2,529,218

COLLET CHUCK

William F. Hunsdorf, Cleveland, Ohio

Application May 10, 1947, Serial No. 747,297

2 Claims. (Cl. 279—48)

This invention relates to chucks for holding bar stock or a bar shaped tool and particularly to a collet chuck.

The primary object of this invention is to provide a collet chuck that cannot permanently distort the collet due to the accidental application of excess pressure to the collet.

Another object is to provide a collet chuck having straight sided collets that can be nested, one inside the other, to adapt a large chuck for use with a small bar.

A further object is to provide a collet chuck that will not draw in the work or tool as the collet is compressed.

Still another object is to provide a collet chuck that is simple in structure and economical to manufacture.

These and other objects of the invention will become apparent from a reading of the following specification and claims, together with the accompanying drawing in which like parts are referred to and indicated by like reference characters and wherein:

Figure 1 is a side view of the collet chuck constituting this invention, with a part broken away to show the internal structure thereof;

Figure 2 is a side view of the collet;

Figure 3 is a left end view thereof taken in the direction of the arrows 3—3 of the Figure 2;

Figure 4 is a right end view thereof taken in the direction of the arrows 4—4 of the Figure 2;

Figure 5 is a cross sectional view of the collet taken along the line and in the direction of the arrows 5—5 of the Figure 2;

Figure 6 is a longitudinal sectional view taken along the line and in the direction of the arrows 6—6 of the Figure 2;

Figure 7 is a side view of a pair of nested collets with portions broken away to show the manner of their arrangement; and Figure 8 is a cross sectional view taken along the line and in the direction of the arrows 8—8 of the Figure 7.

Referring to the Figure 1, there is shown a collet chuck made in accordance with this invention and broadly indicated by the reference character 10.

The chuck comprises a shank member 11, an expansible and contractible collet member 30 for gripping the work bar or tool (not shown) and a nose piece member 20 rotatably mounted on the end of the said shank member as shown.

The shank illustrated has a base 11a adapted to be secured to the face plate of a lathe, although any one of a number of well known base shapes can be used to secure the chuck to a suitable power mechanism.

The shank has an inner bore for receiving the collet 30 and also includes a back stop 13 which is held in place by set screws 14. Reference character 16 indicates an annular ring having an internal frusto-conical shoulder or cam surface 17 having a straight portion 18 perpendicular to the axis of the ring. The ring is free to rotate and is seated against a thrust bearing 15 as shown. The forward end of the shank is threaded to receive the nose piece 20 which has a flange end 21 against which a second annular ring 24 is seated. The bearing 23 receives the end thrust of the ring which is rotatably mounted within the nose piece 20, and is held in place by the retainer 25. This ring also has an internal frusto-conical shoulder or cam surface 26 which includes a straight portion 27 perpendicular to the axis of the ring.

Reference character 30 indicates a cylindrically shaped collet having two axially spaced conical cam surfaces 32 which seat upon the corresponding conical seats 17 and 26 of the shank and nose respectively, whereby upon exertion of longitudinal axial pressure upon the collet 30, the latter is caused to contract radially and thus produce the desired gripping action upon the tool or bar held in the chuck.

A vertical annular shoulder 33 intersects the small diameter of each conical cam surface and is aligned with the corresponding straight portions 18 and 27 of the shank and nose rings. These surfaces are ordinarily spaced a short distance apart during the normal operation of the chuck. However, if the longitudinal axial pressure upon the collet exceeds a predetermined amount, as determined by the width of the normal gap between these surfaces, the opposed surfaces meet and the collet, nose and shank become one solid unit which stops further compression. Thus permanent distortion of the collet, due to overcompression, is avoided.

The flexibility required to permit the contraction of the collet is provided by a plurality of slots 34 which extend longitudinally thru the collet from each end and terminate at a point a fixed distance from the other end, thereby forming a plurality of collet jaws 37 as shown in the Figures 2, 3, 4, 5 and 6. These slots intersect both the outer surface 31 and the inner bore 36 of the collet 30. Terminal holes 35 are first accurately located and then the slots can be easily formed with the assurance that the overall length of all the slots wil be equal, which assures uniform gripping action by all of the collet jaws 31.

The collet is keyed to the shank by means of key-pins 19 which engage a keyway 38 in the collet. This prevents any tendency of the collet to rotate within the shank when the nose piece is rotated and overcomes any inward movement of the tool or bar stock which might occur if the collet were free to rotate while being tightened.

The collet has a straight outer surface 31 which seats in the bore of the shank and insures proper axial alignment between the shank and collet bores at all times. When longitudinal axial pressure is brought to bear upon the collet, it assumes the alternate configuration indicated by reference characters 31a and 36a in the Figure 5. Since the bore 36a contracts uniformly in taking this configuration, the bar or tool is uniformly gripped the entire length of the collet instead of at only one or two points, as is the case with prior art devices.

The straight walled structure of the collet also permits collets to be nested one inside the other as shown in Figures 7 and 8. This is especially appreciated when drills of widely differing size are to be used in quick succession.

The large collet can be left in the chuck and the smaller collet 40 can be directly inserted and locked in the large collet bore 36 as shown. By the use of my device, the number of chuck sizes required is therefore greatly reduced.

The chuck may be made to act as a power-operated collet chuck by loosening the set screws 14 and connecting the back bar 13 to an air cylinder or similar mechanism, whereupon the collet is compressed by the forward movement of the back bar 13 instead of by the axial movement of the nose piece 20.

It will now be clear that there has been provided a collet chuck whose mechanical structure prevents accidental permanent distortion of the collet; whose cylindrically shaped collet permits nesting of the collets, thereby enlarging the useful range of the chuck, and whose component parts involve only simple machine operations in their manufacture, whereby the chuck can be economically produced on a mass production basis. While the invention has been disclosed in its preferred form, it should be understood that the specific embodiment thereof as described and illustrated herein is not to be considered in a limited sense as there may be other forms or modifications of the device which should also be construed to come within the scope of the appended claims.

I claim:

1. In a chuck, the combination of a cylindrical collet having two axially spaced and opposed conical cam surfaces, including annular shoulders perpendicular to the longitudinal axis of the said collet, a plurality of slots extending longitudinally therethrough from both ends of the collet, each slot extending to a point a fixed distance from the other end of said collet and forming a plurality of collet jaws at each end of the collet, and a longitudinally extending keyway intermediate the said slots; a shank carrying the said collet and including a first ring member rotatably mounted within said shank and having a frusto-conical cam surface including a tapered portion and a straight portion, the tapered portion being slidably engaged with one of the two cam surfaces of the said collet, the said straight portion being aligned with the shoulder thereof and normally spaced therefrom; a nose piece mounted on said shank including a radial flange overlapping the outer shoulder of said collet, said nose piece being movable toward said shank, and having a second ring member rotatably mounted against said nose flange and having a frusto-conical cam surface including a tapered portion and a straight portion, the tapered portion being slidably engaged with the other of the said cam surfaces of the said collet; the said straight portion being aligned with the shoulder thereof and normally spaced therefrom, and a key positioned in the aforesaid shank and engageable with the said collet keyway whereby the collet is prevented from rotating relative to the said shank.

2. In a chuck, the combination of a shank member, a nose piece member, and a collet member, the said collet member having slots extending longitudinally therethrough from at least one end thereof forming a plurality of collet jaws at such end, the said collet member also having two axially spaced conical cam surfaces and two axially spaced annular shoulder portions, the said shank member having an internal frusto-conical shoulder including a tapered portion and a straight portion, the tapered portion being slidably engaged with one of the two collet cam surfaces, the said nose piece member having an internal frusto-conical member including a tapered portion and a straight portion, the tapered portion being slidably engaged with the other of the said cam surfaces of the said collet, the straight portions of the shank and nose shoulders being axially aligned with said collet shoulders and normally spaced therefrom, there being means present to prevent rotational movement of said collet, such means including a key and a keyway.

WILLIAM F. HUNSDORF.

REFERENCES CITED

The following references are of record in the file of this patent:

UNITED STATES PATENTS

| Number | Name | Date |
|---|---|---|
| 714,896 | Hanson | Dec. 2, 1902 |
| 808,887 | Trueman et al. | Jan. 2, 1906 |
| 1,570,251 | Hoagland | Jan. 19, 1926 |
| 1,837,419 | Ertel | Dec. 22, 1931 |
| 2,147,227 | Ambler | Feb. 14, 1939 |

FOREIGN PATENTS

| Number | Country | Date |
|---|---|---|
| 46,263 | Norway | of 1929 |